United States Patent [19]

Yoshihara

[11] Patent Number: 5,671,337

[45] Date of Patent: Sep. 23, 1997

[54] NEURON UNIT

[75] Inventor: Takafumi Yoshihara, Tokyo, Japan

[73] Assignee: Olympus Optical Co., Ltd., Tokyo, Japan

[21] Appl. No.: 171,013

[22] Filed: Dec. 21, 1993

[30] Foreign Application Priority Data

Dec. 24, 1992 [JP] Japan .................................. 4-344602
Oct. 8, 1993 [JP] Japan .................................. 5-253138

[51] Int. Cl.$^6$ .................................................. G06F 15/18
[52] U.S. Cl. .............................. 395/27; 395/22; 395/23; 395/24
[58] Field of Search ................................ 395/27, 24, 23, 395/22

[56] References Cited

U.S. PATENT DOCUMENTS

| | | | |
|---|---|---|---|
| 5,131,072 | 7/1992 | Yoshizawa et al. | 395/24 |
| 5,253,329 | 10/1993 | Villarreal et al. | 395/24 |
| 5,256,911 | 10/1993 | Holler et al. | 395/24 |
| 5,261,035 | 11/1993 | Adler | 395/24 |
| 5,278,945 | 1/1994 | Basehore et al. | 395/24 |
| 5,319,737 | 6/1994 | Reibling et al. | 395/24 |
| 5,355,436 | 10/1994 | Shin et al. | 395/24 |
| 5,359,700 | 10/1994 | Seligson | 395/24 |
| 5,467,428 | 11/1995 | Ulug | 395/23 |

OTHER PUBLICATIONS

D.E. Rumelhart; "Learning Internal Representations by Error Propagation"; 1986; pp. 319–362; Parallel Distributed Processing; vol. 1, MIT Press.

*Primary Examiner*—George B. Davis
*Attorney, Agent, or Firm*—Frishauf, Holtz, Goodman, Langer & Chick

[57] ABSTRACT

A neuron unit comprises a synapse section in which input signals from external input means or preceding neuron units and synaptic weights are multiplied, and a neuron section in which output signals of the synapse section are added, subjected to thresholding, subjected to linear or nonlinear conversion, and then outputted to the outside. According to an aspect of the present invention, a synaptic weight used in the synapse section and/or a threshold used in the neuron section, which corresponds in magnitude to an external input, is obtained through interpolation from synaptic weights which have been learned previously, varying in magnitude according to external inputs. According to the other aspect of the present invention, the synaptic weight and/or the threshold is obtained in accordance with a previously set function of an external input.

35 Claims, 8 Drawing Sheets

| $X_1$ | 0 | 0 | 1 | 1 |
|---|---|---|---|---|
| $X_2$ | 0 | 1 | 0 | 1 |
| $\Sigma$ | 0 | -0.5 | 1.0 | 0.5 |

NEURON UNIT

BACKGROUND OF THE INVENTION

1. Field of the Invention

The present invention relates to a neuron unit which has learning, self-organizing and optimizing capabilities and is suitable for pattern recognition, pattern conversion, and associative memory.

2. Description of the Related Art

In general, neural networks are devices in which a large number of neuron units that simulate biological neuron cells are combined into prescribed configurations to carry out information processing for a variety of applications. Such neural networks are specially adapted for flexible information processing at which von Neuman computers now in wide use are weak.

The McCulloch-Pitts' neuron model is generally known as a known type of neuron unit.

Such neuron units are used as basic elements of most neural networks including hierarchical neural networks, such as a back propagation network as described in, for example, "Parallel Distributed Processing", Vol 1, MIT Press, '86, and a perceptron, and interconnect neural networks, such as the Hopfield network and the Boltzmann's machine.

In order to operate a neural network comprising hierarchically connected neuron units of the McCulloch-Pitts type, it is required that a predetermined learning procedure be performed beforehand to meet a processing objective. As one of the learning procedures, there is a learning algorithm called a back propagation learning procedure, which has been used for a wide variety of applications.

However, the back propagation network takes long to complete learning and is liable to encounter a local minimum. It also suffers from the difficulty in adding and learning new data after the termination of learning.

These drawbacks are considered to arise from the insufficient processing capabilities of the neuron units, the insufficient processing capabilities of network structures, the insufficient ability of the back propagation learning procedure and so on. That is, the conventional neuron units of the McCulloch-Pitts type, which mimic the human nerve cells (neurons), are so much simplified in configuration that the processing capabilities inherent in the human nerve cells are lost. This is supposed to form one of the causes for the above-described drawbacks.

SUMMARY OF THE INVENTION

It is therefore an object of the present invention to provide a neuron unit which is permitted to have an improved mapping capability by varying a synaptic weight and/or threshold according to the magnitude of an external input and permits a high-performance, high-speed neural network to be implemented with a small number of neuron units.

According to the present invention there is provided a neuron unit comprising: a synapse section including; synaptic weight generating means for generating synaptic weights each corresponding to the magnitude of a respective one of input signals, and multiplier means for the input signals and the synaptic weights, and a neuron section including; first adder means for adding output signals of the multiplier means together, threshold value generating means for generating a threshold value, second adder means for adding an output of the threshold value generating means to an output of the first adder means, and conversion means for subjecting an output of the second adder means to predetermined conversion.

According to the present invention there is further provided a neuron unit comprising: a synapse-section including, storage means for storing synaptic weights each corresponding to the magnitude of a respective one of predetermined input signals; interpolation means for interpolating synaptic weights corresponding to input signals from external input means or preceding neuron unit by means of interpolation from the synaptic weights stored in the storage means; and multiplier means for multiplying the synaptic weights obtained by the interpolation means and the input signals, and a neuron section including, threshold value storing means for storing a threshold value; threshold value processing means for adding current output signals of the synapse section and previous output signals which the synapse section has output by the last time and performing threshold value processing on the result of the addition when a predetermined number of times of addition is reached; latching means for temporarily latching an output value of the threshold value processing means and feeding the latched value back to the threshold means; count means for counting the number of times latching has been performed by the latching means; and function processing means for subjecting to predetermined conversion an output of the latching means after the latching has been performed a predetermined number of times and outputting it to the outside.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinafter, the embodiments of the present invention will be described.

Figure 2:
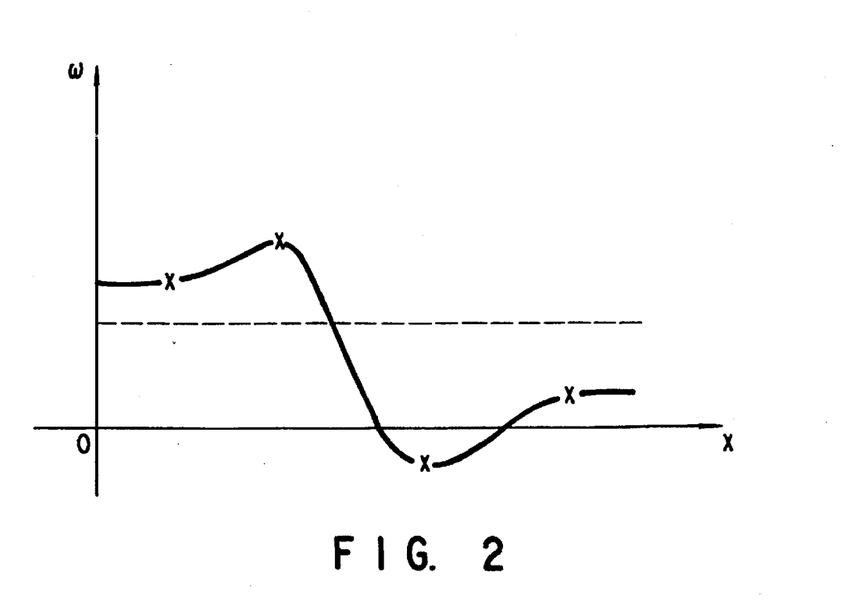
FIG. 2 shows the concept of the neuron unit of the present invention.

First, the concept of a neuron unit of the present invention will be described. FIG. 2 represents the relationship of the synapse coupling weight w in the synapse section of a neuron unit to an input x from outside or another neuron unit. As shown dotted in the figure, the synaptic weight w of a conventional McCulloch-Pitts neuron unit is constant regardless of the magnitude of input x from outside or another neuron unit. As indicated by solid line in FIG. 2, however, the synaptic weight w of a neuron unit of the present invention varies with the magnitude of input x from outside or another neuron unit. That is, the synaptic weight w is represented by a function of input x, i.e., w(x).

For the synaptic weights, there are cases in which no functional formula is set intentionally (first through fifth embodiments) and cases in which a function is set in advance (sixth through tenth embodiments).

The synaptic weights when no function is set are acquired by learning as in the conventional system. Learning data input x take discrete values and, according to the present system, synaptic weights w(x) obtained take discrete values as indicated by crosses. An unknown synaptic weight w(x) enables a calculation of values between each synaptic weight w (x) obtained from learning by means of interpolation. Synaptic weights whose function has been set previously can be obtained by learning of coefficients used in this function.

Neuron units with such synaptic weights are connected in a hierarchical relationship or interconnected to form a neural network.

Figure 1:
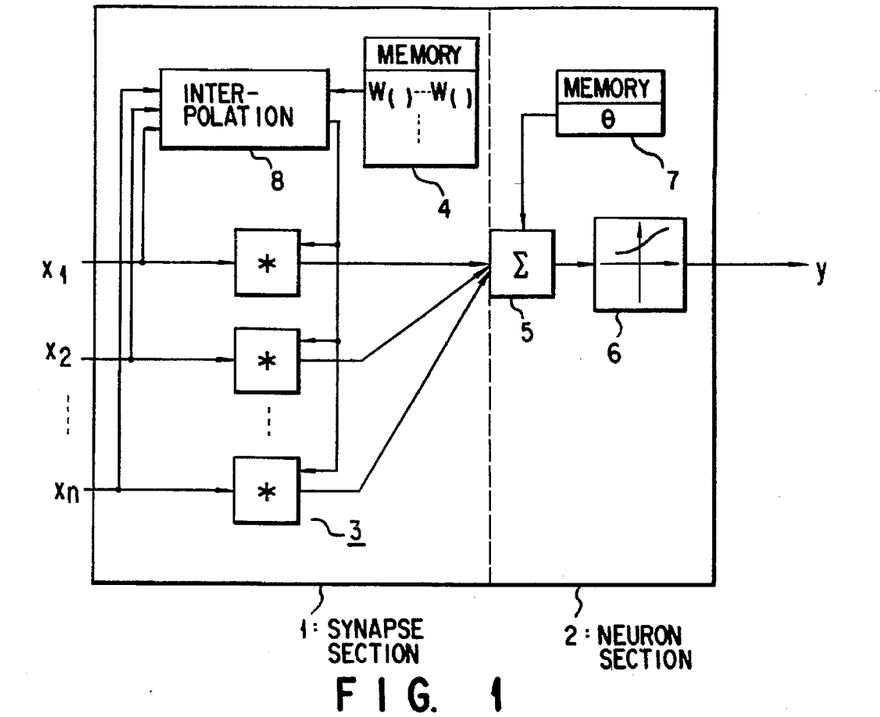
FIG. 1 shows a configuration of a neuron unit according to a first embodiment of the present invention.

FIG. 1 shows a configuration of a neuron unit according to a first embodiment of the present invention.

The neuron unit of FIG. 1 is roughly divided into a synapse section 1 and a neuron section 2. The synapse section 1 is composed of multipliers 3, a memory 4 storing synaptic weights, and an interpolation processing unit 8 for calculating a value between weights w from the memory 4. In the memory 4 one or more synaptic weights $w_k$ are stored which act on externally supplied inputs $x_k$. The synaptic weight is represented by $w_k(x_k)$ and has an input-dependent magnitude.

The neuron section 2 is composed of an adder 5, a sigmoid function circuit 6, and a memory 7 storing a threshold value $\theta$.

The operation of the neuron unit thus constructed will be described.

First, external inputs $x_k$ are applied to the multipliers 3 and the interpolation processing unit 8. The interpolation processing unit 8 reads synaptic weights $w_k(x_k')$, $w_k(x_k'')$, ..., which have been obtained by learning and stored previously, from the memory and then obtains synaptic weights $w_k(x_k)$ from the inputs $x_k$ and the read synaptic weights by means of appropriate interpolation.

In this case, as the interpolation method use may be made of nearest-neighbor interpolation $$W_k(x_k) = W_k(x_\gamma)$$

where $$\gamma = \arg \underset{j}{\min} \ (|x_k - x_j|),$$

linear interpolation $$W_k(x_k)=W_k(x_{k\gamma})+(W_k(x_{k\gamma}+1)-W_k(x_{k\gamma}))\cdot(x_k-x_{k\gamma})/(x_{k\gamma}+1-x_{k\gamma})$$

where $x_k1 \leq x_k2 \leq \ldots \leq x_{k\gamma} \leq x_k \leq x_{k\gamma}+1 \leq \ldots$, or polynomial interpolation such as Lagrange interpolation or spline interpolation.

In each of the multipliers 3 the product $x_k \cdot W_k(x_k)$ of the input $x_k$ and the corresponding synaptic weight $w_k(x_k)$ obtained by the interpolation processing unit 8 is calculated, and the result is then sent to the adder 5 in the neuron section 2.

As in the conventional neuron unit, the adder 5, which is supplied with the threshold value $\theta$ from the memory 7, performs arithmetic operation of addition, so that the result $$Z = \sum_{k=1}^{n} x_k \cdot W_k(x_k) + \theta$$

is obtained. The result is subjected to nonlinear conversion in the sigmoid function circuit 6 and then output to the outside. The function to be employed in the sigmoid function circuit 6 is not restricted to a sigmoid function but may be another nonlinear function or a linear function.

For example, in the case of a sigmoid function with nonlinear input-output relation, for inputs $x=(x_1, x_2, \ldots, x_n)$, the neuron unit provides an output $$y = f\left( \sum_{k=1}^{n} X_k \cdot W_k(X_k) + \theta \right) \text{ where}$$

$$f(z) = \frac{1}{1 + \exp(-z)} \text{ or}$$

$$f(z) = \frac{1 - \exp(-z)}{g(1 + \exp(-z))} \ (g \geq 1)$$

In the present embodiment, f(z) is also suited for a sigmoid function which, like equation (a), takes the neighborhood of 0.

Figure 3:
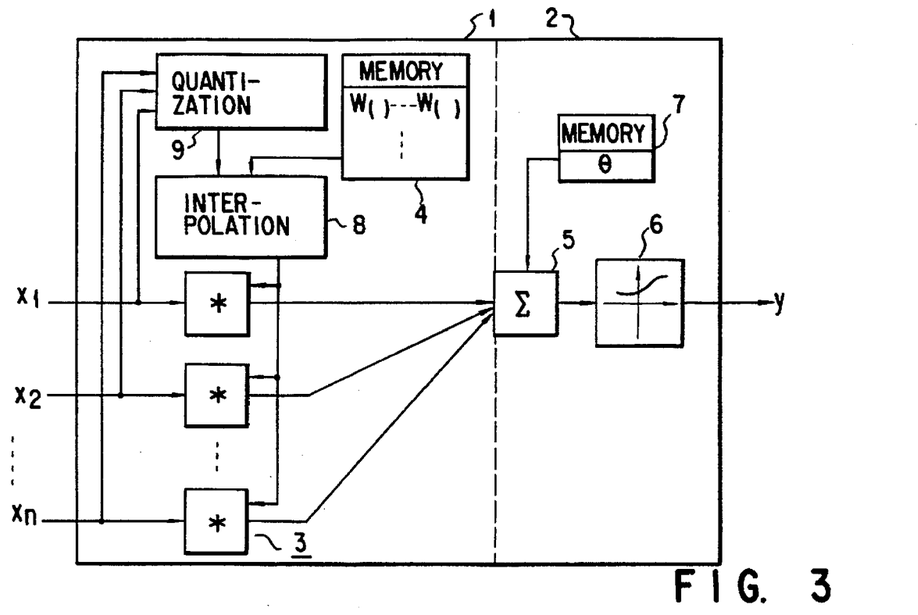
FIG. 3 shows a configuration of a neuron unit according to a second embodiment of the present invention.

In FIG. 3 there is shown a neuron unit according to a second embodiment of the present invention, which is equipped with a quantization unit 9 for quantizing external inputs $x_k$ which is added to the synapse section 1 of the neuron unit of the first embodiment. Hereinafter, the operation of this type of neuron unit will be described.

First, the external inputs $x_k$ are applied to the multipliers 3 and the quantization unit 9. In the quantization unit 9 the inputs are converted, using an appropriate quantization step size to be described later, to corresponding quantized values $x_k'$, which are then applied to the interpolation unit 8.

The interpolation unit 8 reads the previously stored learning-based, synaptic weights $W_k(x_k'')$, $W_k(x_k''')$ ... from the memory 4 and then performs the same interpolation as in the first embodiment.

The neuron unit of the second embodiment can alter the quantization step size according to the degree of difficulty of an application. That is, with the maximum quantization step size, the neuron unit will become equivalent to the conventional neuron unit, which reduces the size of the memory 4 to a minimum. If, on the other hand, the quantization step size were taken to conform to the size of the memory 4 and synaptic weights each corresponding to respective quantized values were stored in the memory 4, the interpolation unit 8 could obtains,synaptic weights $W_k(x_k')$ more rapidly as in the case where a lookup table were used.

Figure 4:
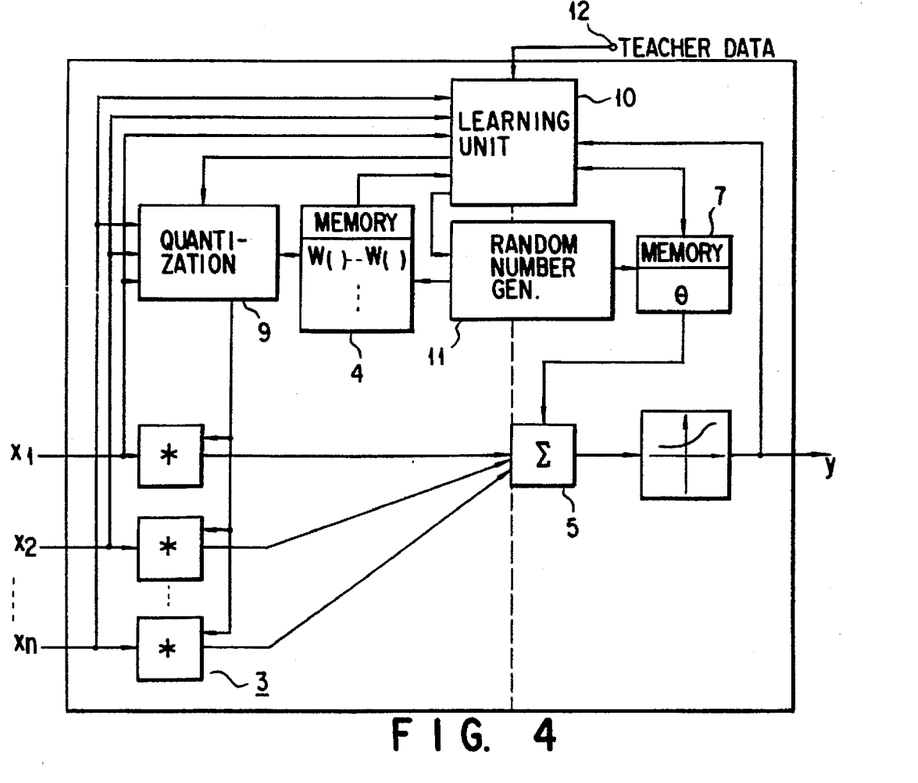
FIG. 4 shows a circuit arrangement for learning the threshold value θ of the memory and the synaptic weights of a neuron unit according to a third embodiment of the present invention.

Another neuron unit according to a third embodiment of the present invention will be described next. FIG. 4 shows a circuit arrangement of the neuron unit which is adapted to learn the memory threshold value 74 and the synaptic weights. In this figure, corresponding parts to those in FIG. 1 are designated by like reference numerals and their descriptions are omitted.

The third embodiment is different from the first embodiment of FIG. 1 in that in the third embodiment the interpolation unit 8 is excluded and a learning processing unit 10, a random number generator 11 and a quantization unit 9 are added instead. Target data 12 is externally applied to the learning unit 10. A learning procedure will be described hereinafter taking a back propagation learning procedure by way of example.

First, the learning processing unit 10 sets very low random numbers generated by the random number generator 11 as initial values of synaptic weights $w_k = (w_k(s), w_k(2s), \ldots, w_k(ms))$ and a threshold value $\theta$ in the memories 4 and 7. Here, m is the number of quantization ranges or levels and s is the quantization step size.

Learning data $x = (x_1, x_2, \ldots, x_k, \ldots, x_n)$ is externally applied to the multipliers 3 and the quantization unit 9. The quantization unit 9 quantizes each input $x_k$ to a corresponding quantized value $x_s'$ using an appropriate quantization step size s, reads a synaptic weight $w_k(x_s')$ corresponding to $x_s'$ from the memory 4, and sends it to the corresponding multiplier 3.

In each multiplier the product of input $x_k$ and synaptic weight $w_k(x_s')$ is calculated, which is then sent to the adder 5 in the neuron section 2. In the adder 5 the sum of the threshold value $\theta$ from the memory 7 and the outputs of the multipliers 3 is calculated by $$\sum_{k=1}^{n} x_k \cdot W_k(x_s') + \theta$$

The output of the adder 5 is then subjected to nonlinear conversion $f(\cdot)$ in the sigmoid function circuit 6.

Using a steepest gradient descent procedure the learning unit 10 minimizes an error function given by $$E = \frac{1}{2}(y-d)^2$$

where $$y = f(\Sigma x_k \cdot W_k(x_s') + \theta)$$

and d is target data corresponding to y.

In the gradient descent, $w_k$ and $\theta$ are successively corrected in proportion to the respective partial derivatives of the error function E with respect to the synaptic weight $w_k$ and with respect to the threshold value $\theta$. Namely, $$W_k(t+1) = W_k(t) - \epsilon \partial E / \partial W_k(t)$$

and $$\theta_k(t+1) = \theta(t) - \epsilon \partial E / \partial \theta(t)$$

where $\epsilon$ is a coefficient defining learning rate, and t stands for the learning step number (time). The values x, w, $\theta$ and y needed for calculations are received from the outside, the memory 4, the memory 7, and the sigmoid function circuit 6, respectively.

The synapse coupling weight $w_k$ and the threshold value $\theta$ on the memories 4 and 7 which correspond to the quantized value $x_s'$ obtained by the quantization unit 9 are replaced by the synaptic weight $w_k$ and the threshold value $\theta$ which have been newly obtained by the learning unit 10. Subsequent to the memory initialization by the random number generator 11 the same process is repeated for all the learning data until the error function E falls to an allowable value or below.

Since the learning data is generally given as discrete values, with the learning processing of the present embodiment, the synaptic weights $w_k$ to be learned are also discrete on the input axis. To accommodate unknown data inputs the synaptic weights $w_k$ already learned are used for the above-described interpolation at execution time after the termination of learning. Although, in the above-described example of learning, the number of quantization levels for synaptic weights w, m, is fixed, it may be changed in the middle of learning.

For example, the number of quantization levels, m, may be set to one at the start of learning so that it increases as the learning progresses. That is, a back propagation learning procedure using a conventional neuron unit is performed at an early stage in the learning, which permits a rough mapping relation to be learned. At a late stage in the learning, a detailed mapping relation can be acquired by the neuron unit of the present invention. When the number of quantization levels is one, the neuron unit of the present invention is equivalent to a conventional one. The present invention thus involves the conventional neuron unit as its special example.

Although the back propagation learning procedure is used here as a method of learning, it is easy to use another conventionally proposed procedure such as perceptron learning, Hebb learning, orthogonal learning, self-organizing learning or the like.

Where learning is performed using the neuron unit of the present invention in which no function has been set explicitly as the synaptic weights w(x), corrections on the synaptic weights w for learning data becomes local on the input x axis. As a consequence, the time needed for learning is reduced through the local learning and the learning of additional data is facilitated.

Moreover, our computer simulation shows that the possibility of encountering a local minimum is reduced.

Furthermore, since the mapping capability of the neuron unit is improved by the local learning, a smaller number of neuron units can be used to construct a neural network having the same mapping capability as was obtained by the use of conventional neuron units. Thus, the wires required among networks, which has conventionally been enormous in number, can be reduced in number, facilitating an LSI version of the networks.

Results of computer simulation on a parity problem show that the speed of learning is increased by a factor of 10 to 100 over conventional neuron units.

Figure 5:
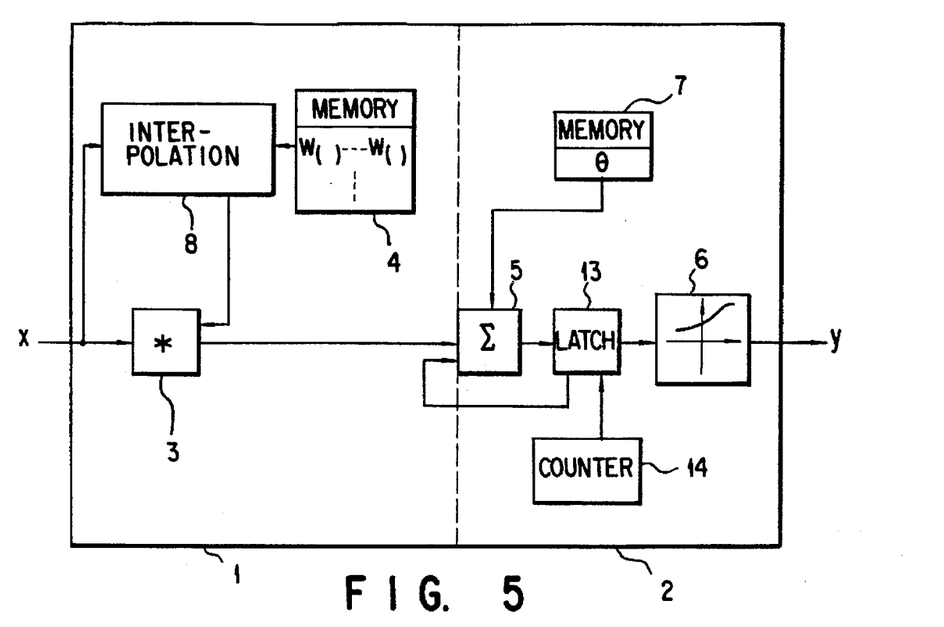
FIG. 5 shows a configuration of a neuron unit according to a fourth embodiment of the present invention.

FIG. 5 shows a neuron unit according to a fourth embodiment of the present invention.

Whereas the first embodiment is directed to a multiinput-one-input neuron unit, this embodiment is directed to a one-input-one-output neuron unit, which receives inputs on a time-division multiplexing basis to thereby perform the same function as the first embodiment. Unlike the first embodiment, the synapse section 1 has only one multiplier 3, and a latch circuit 13 for temporarily storing sum-of-products data and a counter 14 are added to the neuron section 2. The operation of this neuron unit will be described below.

Suppose that externally applied inputs $x=(x_1, x_2, \ldots, x_k, \ldots x_n)$ are a serial data stream. When input $x_k$ is applied to the multiplier 3 and the interpolation unit 8, the interpolation unit reads previously stored, synaptic weights $w_k(x_k')$, $w_k(x_k''), \ldots$ from the memory 4 and then performs the same interpolation as in the first embodiment. Using a synaptic weight $w_k(x_k)$ obtained in the interpolation unit 8, the multiplier 3 calculates the product $x_k \cdot w_k(x_k)$ and then sends it to the adder 5 in the synapse section 2.

The adder 5 adds the output from the multiplier 3 and the output of the latch circuit 13

$$\sum_{i=1}^{k-1} x_i \cdot W_i(x_i)$$

to obtain $$\sum_{i=1}^{k} x_i \cdot W_i(x_i)$$

The result is returned to the latch circuit 13. The counter 14 counts the number of times the latching is performed. After the addition has been performed for each of the inputs $x_1$, $x_2, \ldots, x_n$, the threshold value $\theta$ in the memory 7 is added to the output of the latch circuit 13. The result is sent to the latch circuit 13. The resultant output data of the latch circuit 13 is sent to the sigmoid function circuit 6 where it is subjected to nonlinear conversion $f(\cdot)$.

The use of the neuron unit of the present embodiment permits the number of wires in a network to be reduced considerably. That is, the multipliers in the synapse section 1, which are equal in number to the wires, can be decreased in number to one. This results in a significant decrease in the amount of hardware. However, the processing speed will be somewhat reduced because the inputs are supplied on a time-division multiplexing basis.

Figure 6:
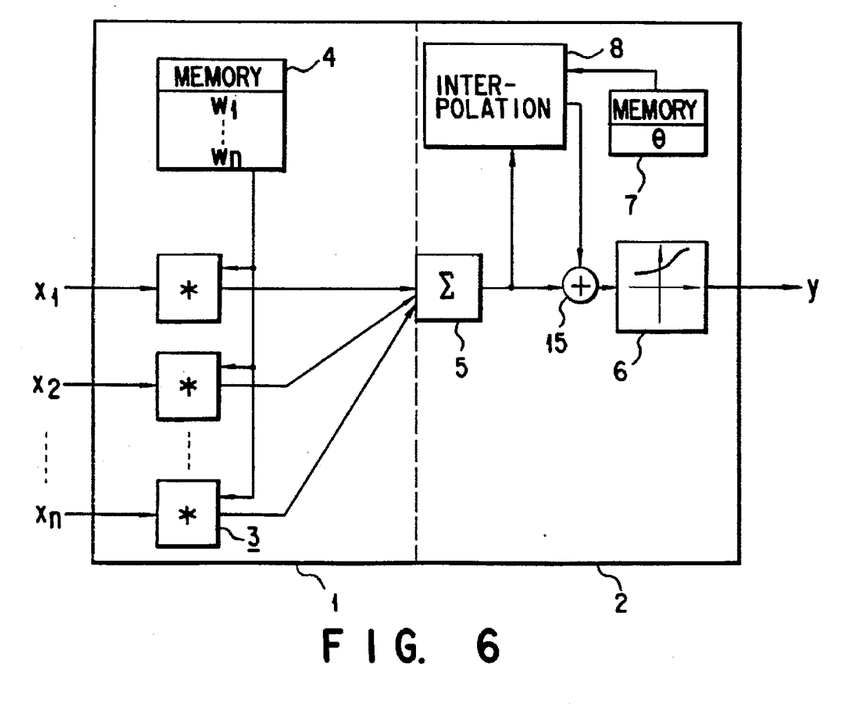
FIG. 6 shows a configuration of a neuron unit according to a fifth embodiment of the present invention.

FIG. 6 shows a neuron unit according to a fifth embodiment of the present invention.

In the neuron unit of the first embodiment, the synaptic weight $w_k$ for $x_k$ of the inputs $X=(X_1, X_2, \ldots, X_k, \ldots, x_n)$ is stored divided into one or more, while, in the neuron unit of the present embodiment, the threshold value $\theta$ is stored divided into one or more in the memory 7.

The synapse section 1 is the same as that of the conventional neuron unit. An interpolation unit for the threshold value and an adder 15 are added to the neuron section 2. The memory 7 is expanded so that it can store a plurality of threshold values. The operation of this type of neuron unit will be described hereinafter.

The synapse section 1, as in the conventional neuron unit, calculates $x_k \cdot w_k$ and sends it to the neuron section 2. In the neuron section 2, the sum $$y = \sum_{k=1}^{n} x_k \cdot W_k$$

is calculated in the adder 5. The result is applied to the interpolation unit 8 and the adder 15.

The interpolation unit 8 reads from the memory 7 threshold values $\theta(y'), \theta(y''), \ldots$ already obtained by a learning procedure and then obtains a threshold value $\theta(y)$ from the sum y and the threshold values $\theta(y'), \theta(y\Delta), \ldots$ by means of appropriate interpolation. For this interpolation, the same technique as in the first embodiment can be used. In the adder 15, $y + \theta(y)$ is calculated, which is subjected to nonlinear conversion $f(\cdot)$ in the sigmoid function circuit 6 and then output to the outside.

The fifth embodiment can reduce the memory size as compared with the first embodiment. This is because, although the number of synaptic weights w stored in the memory 4 is proportional to the number of dimensions, n, of inputs $x=(x_1, x_2, \ldots, x_n)$, the number of dimensions of threshold values $\theta$ stored in the memory 7 is one and thus the memory size need not be much increased.

In the case of an exclusive OR (XOR) in which input data is incapable of linear separation, in order to separate input data using a hierarchical network constructed from conventional neuron units or the neuron units of the first embodiment, an intermediate layer must be used.

Figure 7A:
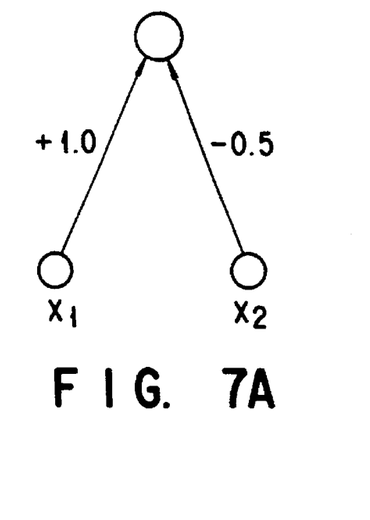
FIG. 7A shows a configuration of a neural network with an intermediate layer.
Figure 7B:
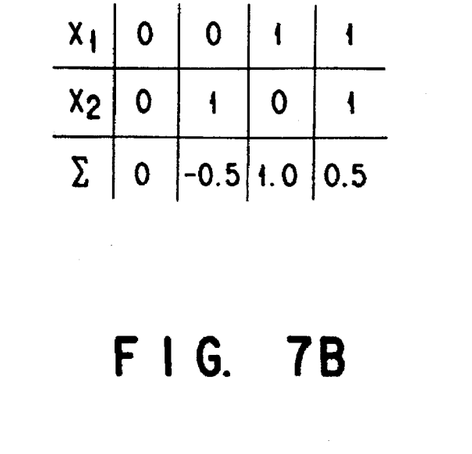
FIG. 7B shows the sum of products of the neuron unit of the output layer in XOR when synapse coupling coefficients are constant.

In the present embodiment, however, even such a neural network with no intermediate layer as shown in FIG. 7A permits separation. FIG. 7B shows the sums of products from the output layer unit in an XOR in which synaptic weights w are +1.0 and −0.5. To permit separation, it is required that $\theta(0)<0$, $\theta(-0.5)>0.5$, $\theta(1.0)>-1.0$, and $\theta(0.5) <-0.5$.

Figure 8:
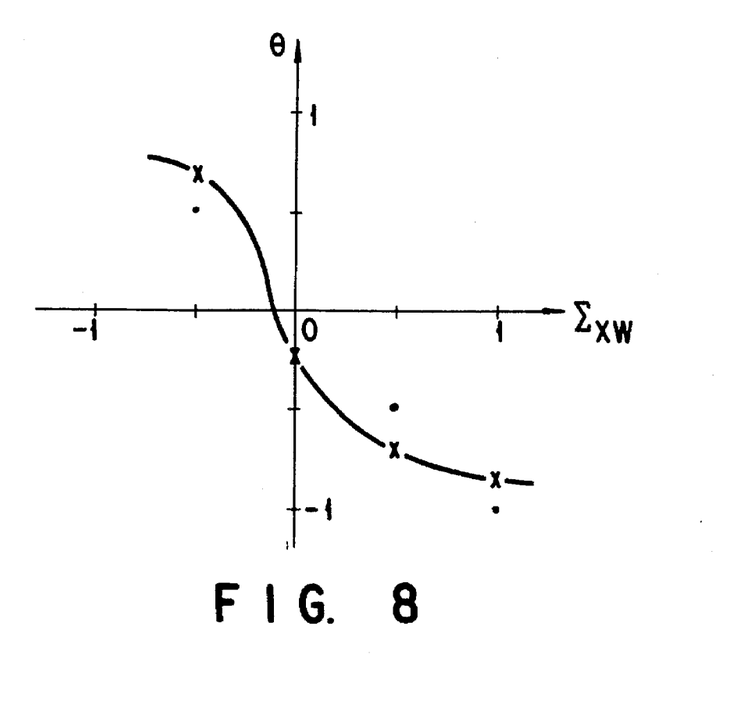
FIG. 8 shows threshold value θ versus sum of products.

That is, the threshold value $\theta$ is set dependent on the sum $(\Sigma \times w)$ of products as shown in FIG. 8.

The threshold value $\theta$ can be acquired by a back propagation learning or perceptron learning procedure using the same learning circuit as in FIG. 4. In the present embodiment as well, the synapse section can be constructed identically to that in the first embodiment.

Hereinafter, embodiments in which functions are given explicitly as synaptic weights w(x) will be described.

Figure 9:
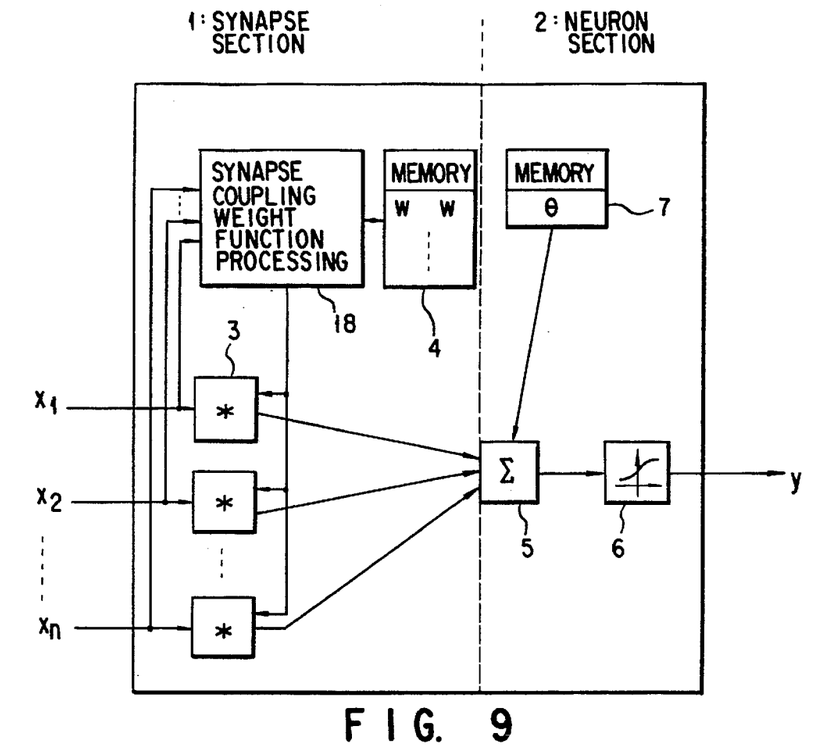
FIG. 9 shows a configuration of a neuron unit according to a sixth embodiment of the present invention.

FIG. 9 shows a neuron unit according to a sixth embodiment of the present invention. This neuron unit differs in the arrangement of the synapse section from the conventional device in which only synaptic weights $w_1, w_2, \ldots, w_k, \ldots, w_n$ that are independent on external inputs $x_1, x_2, \ldots, x_k, \ldots, x_n$ are stored in a memory.

This neuron unit is roughly divided into a synapse section 1 and a neuron section 2. The synapse section 1 is composed of multipliers 3, a memory 4 storing coefficients of a synaptic weight function, and a synaptic weight function processing unit 18 for calculating, synaptic weights $w_1, w_2, \ldots, w_k, \ldots, w_n$ using the coefficients from the memory 4. In the memory 4 one or more coefficients for obtaining the synaptic weight $w_k$ are stored for each multiplier k. The number of coefficients depends on the type of the synaptic weight function. The neuron section 2 is constructed from an adder 5, a sigmoid function circuit 6, and a memory 7 storing a threshold value $\theta$.

The operation of this type of neuron unit will be described next.

External inputs $x_1, x_2, \ldots, x_k, \ldots x_n$ are applied to the multipliers 3 and the synaptic weight function processing unit 18. The unit 18 reads learning-based coefficients $w_{k1}, w_{k2}, \ldots, w_{km}$ (m=the number of the coefficients) from the memory 4 and then calculates a synaptic weight $w_k$ according to the previously set synaptic weight function. If, for example, the synaptic weight function has been set as a second-degree function of external input $x_k$, then the synaptic weight $w_k$ will be represented by $$w_k = w_{k1} \cdot x_k^2 + w_{k2} \cdot x_k + w_{k3}.$$

Thus, three coefficients $w_{k1}, w_{k2}, w_{k3}$ are read from the memory 4.

Figure 10:
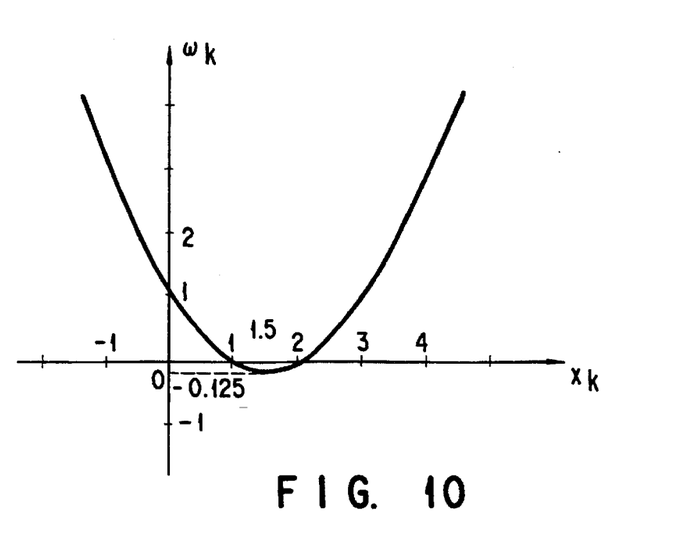
FIG. 10 is a graph of a synaptic weight function.

Supposing that $w_{k1}=0.5$, $w_{k2}=1.5$, and $w_{k3}=1.0$, the synaptic weight function will be graphically represented as shown in FIG. 10. The synaptic weight $w_k$ can be calculated such that $w_k=-0.125$ for $x_k=1.5$, and $w_k=1.0$ for $x_k=3$. Those coefficients are acquired by a learning procedure to be described later. The synaptic weight $w_k$ thus obtained in the function processing unit 18 is multiplied by the input $x_k$ in the kth multiplier 3 to provide the product $x_k \cdot w_k$, which is sent to the adder 5 in the neuron section 2. Thereafter, as in the conventional device, the threshold $\theta$ from the memory 7 is $$\sum_{k=1}^{n} x_k \cdot W_k + \theta$$

added to the sum of products in the adder 5, and then the nonlinear conversion is performed in the sigmoid function circuit 6.

As compared with the first embodiment, the present embodiment permits a reduction in the amount of parameters, i.e., the memory size. Although, in the present embodiment, the synaptic weight function is set as a second-degree function of input $x_k$, it may be another function of another input $x_j$, such as trigonometric function, exponential function, or spline function. Further, a different type of synaptic weight function may be applied to each of the multipliers. For example, synaptic weight functions may be set such that $$W_k = x_j W_{k1} + W_{k2}$$

and $$W_{k+1} = W_{k+1,1} \cdot \sin(W_{k+1,2} \cdot x_{k+1} + W_{k+1,3})$$

Also, the type of function used in the sigmoid function circuit 6 is not restricted to the sigmoid function, and another nonlinear or linear function may be used instead.

Having a nonlinear responsibility to inputs in its synapse section, the neuron unit of the sixth embodiment permits a high degree of information processing capability.

Figure 11:
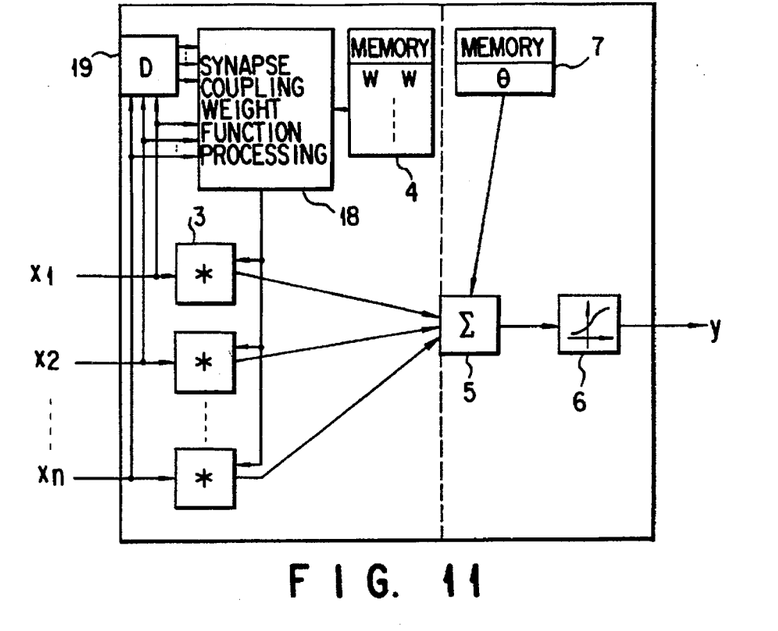
FIG. 11 shows a configuration of a neuron unit according to a seventh embodiment of the present invention.

FIG. 11 shows a neuron unit according to a seventh embodiment of the present invention.

This type of neuron unit has a signal delay circuit 19 that is added to the synapse section 1 of the previously described neuron unit of the sixth embodiment.

The operation of this neuron unit will be described hereinafter. External input $x_k^t$ (t= time) is applied to the multiplier 3, the synaptic weight function processing unit 18, and the signal delay circuit 19. To the processing unit 18 the preceding input $x_k^{t-1}$ delayed by the delay circuit 19 is applied simultaneously. The processing unit 18 reads previously-stored learning-based weights $w_{k1}, w_{k2}, \ldots, w_{km}$ of a synaptic weight function from the memory 4 and calculates a synaptic weight $w_k$ according to the synaptic weight function involving the delayed input $x_k^{t-1}$. When the synaptic weight function is set as a first-degree function of the external inputs $x_k^t$ and $x_k^{t-1}$, the synaptic weight $w_k$ will be $$W_k = W_{k1} \cdot x_k^t + W_{k2} \cdot x_k^{t-1} + W_{k3}$$

The synaptic weight $w_k$ thus obtained is multiplied by the input $x_k$ in the kth multiplier and the resultant product $x_k \cdot w_k$ is then sent to the adder 5 in the neuron section 2. The subsequent processing is the same as that in the conventional neuron unit. The seventh embodiment permits direct processing of a time-varying signal, such as an audio signal, because delayed signals are included in the synaptic weight function. Connecting of signal delay circuits in stages would permit delayed signals of several processing cycles before to be entered into the synaptic weight function processing unit 18. This would provide greater precision in processing of a time-varying signal.

Figure 12:
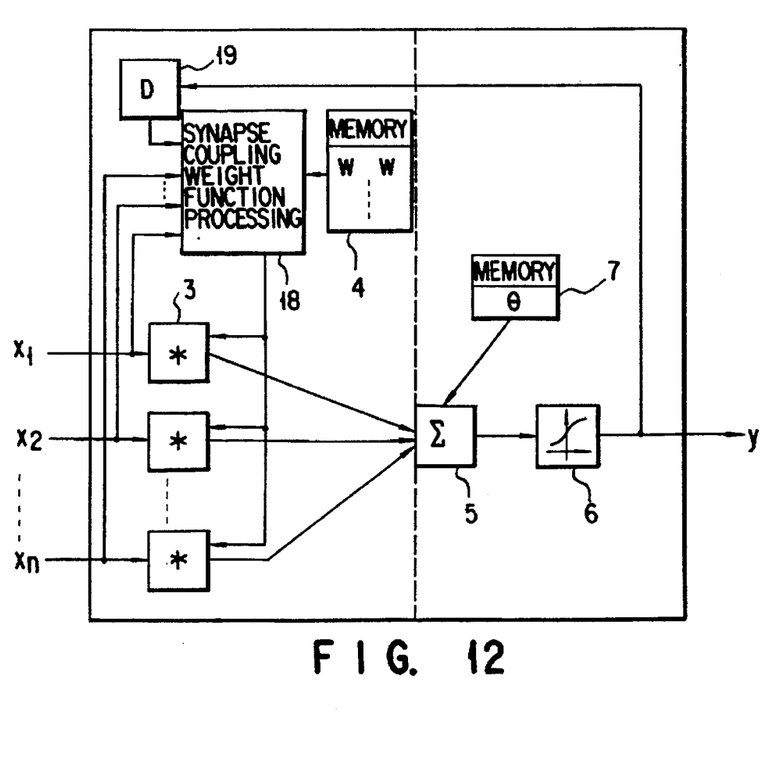
FIG. 12 shows a configuration of a neuron unit according to an eighth embodiment of the present invention.

FIG. 12 shows an eighth embodiment which is a modification of the seventh embodiment.

The eighth embodiment is characterized in that the signal delay circuit 19, which, in the seventh embodiment, receives external inputs $x_k^t$, is connected to receive output $y^t$ of the neuron section.

In operation, the synaptic weight function processing unit 18 simultaneously receives external inputs $x_k^t$ and an output $y^{t-1}$ of the neuron section, which was output one processing cycle previously, via the delay circuit 19. The external inputs xkt, as in the seventh embodiment, are applied to the multipliers 3 as well. The processing unit 18 reads previously-stored learning-based coefficients $w_{k1}, w_{k2}, \ldots, w_{km}$ for a synaptic weight function from the memory 4 and then calculates a synaptic weight $w_k$ according to the synaptic weight function involving the delayed signal $y^{t-1}$. The subsequent processing is the same as that in the seventh embodiment.

The eighth embodiment is arranged such that the output $y^t$ of the neuron section is fed back so as to calculate the next output $y^{t+1}$. Thus, theoretically the signal delay will be performed endlessly. This is considered substantially equivalent to connecting signal delay circuits in stages and using delayed inputs $x_k^{t-1}, x_k^{t-2}, \ldots$ which were input several processing cycles previously, in the seventh embodiment. As a consequence, the present embodiment may be considered to have reduced the number of signal delay circuits to the minimum.

Figure 13:
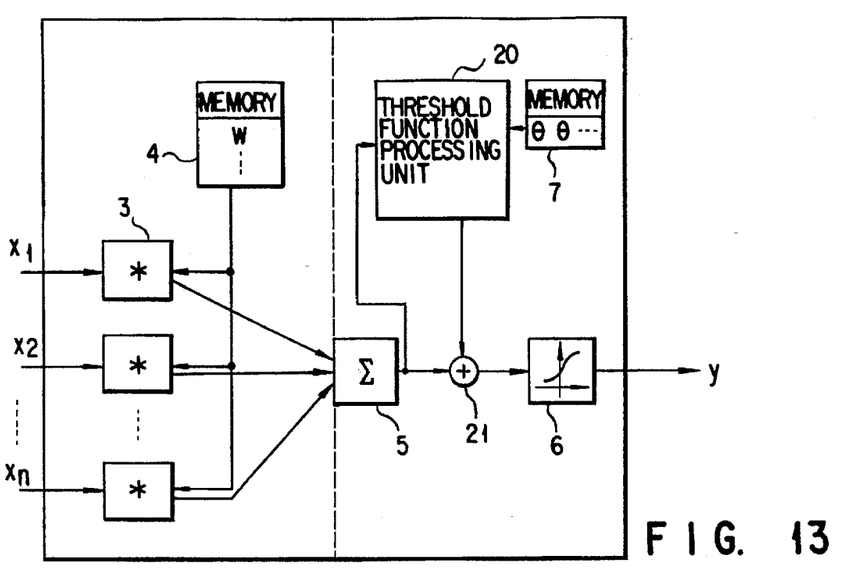
FIG. 13 shows a configuration of a neuron unit according to a ninth embodiment of the present invention.

FIG. 13 shows a neuron unit according to a ninth embodiment of the present invention. Whereas the neuron unit of the sixth embodiment calculates synaptic functions for external inputs $x_1, x_2, \ldots, x_k, \ldots, x_n$, the neuron unit of the ninth embodiment is characterized by calculating a threshold function for the $$\left( \sum_{k=1}^{n} x_k \cdot W_k \right)$$

output of the adder 5 in the neuron section 2 to obtain a threshold value $\theta$.

In arrangement, the synapse section 1 is the same as that of the conventional neuron unit. In the neuron section 2, on the other hand, a threshold value function processing unit 20 for calculating a threshold value $\theta$ and an adder 21 are added. In the memory 4 are stored coefficients for a threshold value function. The operation of the neuron unit thus configured will be described below.

In the synapse section 1, as in the conventional neuron unit, the product of input $x_k$ and synaptic weight $w_k$ is calculated and then sent to the neuron section 2. In the adder 5 of the neuron section 2, the sum of products $$\sum_{k=1}^{n} x_k \cdot W_k$$

is produced and then sent to the threshold function processing unit 20 and the adder 21. The processing unit 20 reads a number m of previously-stored learning-based coefficients $\theta_1$ to $\theta_m$ for a threshold value function from the memory 7 and then calculates a threshold value $\theta$ using the previously set threshold value function. If the threshold value function is set as a sine function by way of example, the threshold value $\theta$ will be represented such that $$\theta = \theta_1 \cdot \sin\left(\theta_2 \cdot \sum_k x_k \cdot W_k + \theta_3\right) + \theta_4$$

In this case, therefore four coefficients $\theta_1, \theta_2, \theta_3$, and $\theta_4$ will be read from the memory 7. The coefficients are acquired by a learning procedure which will be described later. The threshold value $\theta$ thus obtained by the function processing unit 20 is added in the adder 21 to the sum of products $$\sum_k x_k \cdot W_k$$

output from the synapse section 1 providing $$\sum_k x_k \cdot W_k + \theta.$$

The result is subjected to nonlinear conversion in the sigmoid function circuit 6 and then output to the outside.

As compared with the sixth embodiment of FIG. 9, the ninth embodiment can reduce memory size. The reason is that, although the number of synaptic weight function coefficients stored in the memory 4 in the sixth embodiment increases in proportion to the dimensionality, n, of the external inputs $x_1, x_2, \ldots, x_k, \ldots, x_n$, the dimensionality of threshold value 8 function coefficients stored in the memory 7 in the ninth embodiment is one and thus the memory 7 simply has a small increase in its size.

Figure 14:
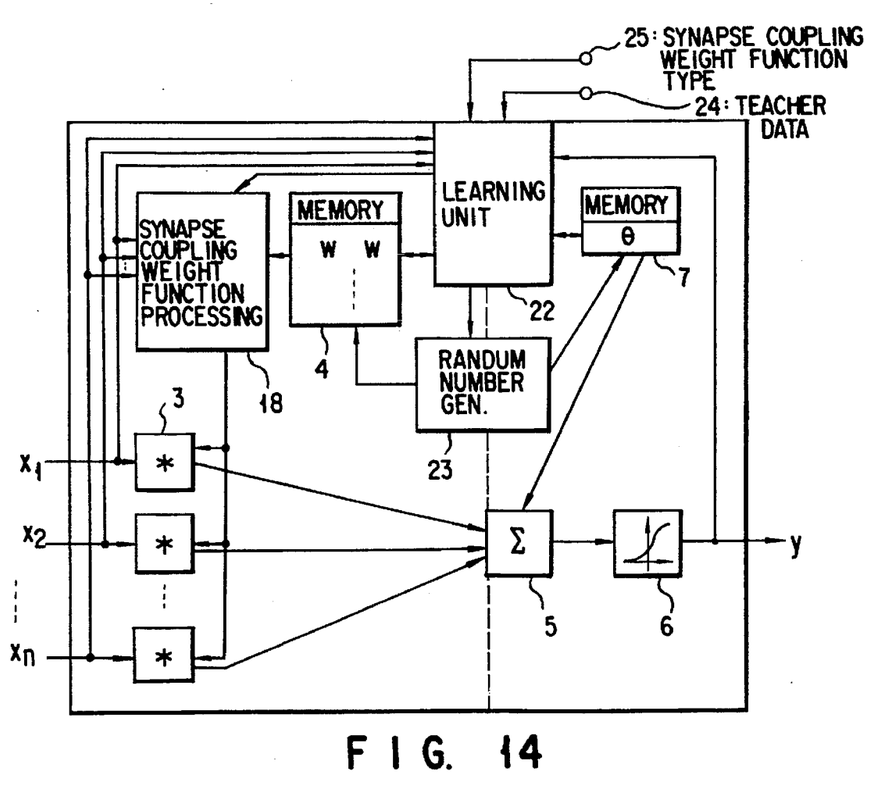
FIG. 14 shows a configuration of a neuron unit according to a tenth embodiment of the present invention.

FIG. 14 shows a neuron unit according to a tenth embodiment of the present invention. The tenth embodiment is adapted to learn the synaptic weight function coefficients $w_{km}$ in the synapse section 1 and the threshold value $\theta$ in the neuron section 2 in the sixth embodiment shown in FIG. 9. This neuron unit has a learning processing unit 22 and a random number generator 23 added to the sixth embodiment. Target data 24 and a synaptic weight function type 25 are applied from the outside to the learning processing unit 22. Hereinafter, a back-propagation-based learning procedure will be described.

When told a synaptic weight function type used from the outside, the learning processing unit 22 initializes the synaptic weight function processing unit 18 to permit processing of a specific function that has been set.

The learning processing unit 22 uses very low random numbers generated by the random number generator 23 as initial values of the synaptic weight function coefficients $w_{k1}, w_{k2}, \ldots, w_{km}$ and the threshold value $\theta$.

Input data adapted for learning, $x_1, x_2, \ldots, x_k, \ldots, x_n$, is applied to the multipliers 3, the synaptic weight function processing unit 18 and the learning processing unit 22 in the synapse section 1. The synaptic weight function processing unit 18 computes the set function using the input data and the synaptic weight function coefficients read from the memory 4 to obtain synaptic weights $w_k$. In each of the multipliers 3 the product of the input $x_k$ and the coupling weight $w_k$ is computed. Subsequently, the threshold value $\theta$ from the memory 7 is added to the sum of products in the adder 5 in the neuron section 2 to yield $$\sum_k x_k \cdot W_k + \theta$$

In the sigmoid function circuit 6 the output of the adder 5 is subjected to the following nonlinear conversion $$f(z) = \frac{1}{1 + \exp(-z)}$$

As a result, an output is obtained which is represented by $$y = f\left(\sum_k x_k \cdot W_k + \theta\right)$$

Next, the learning processing unit 22 implements a gradient descent procedure in the sum-squared error function $$E = \frac{1}{2}(y - d)^2$$

where d is target data 24 corresponding to output y. Thereby, the error is minimized. In the gradient descent procedure, $w_{km}$ and $\theta$ are successively corrected in proportion to the derivative of the error function E with respect to the coefficient $w_{km}$ and the derivative of the error function with respect to the threshold value $\theta$, respectively. Namely, learning computations are performed as follows:

$$W_{km}(t+1) = W_{km}(t) - \eta_1 \cdot \frac{\partial E}{\partial W_k(t)} \cdot \frac{\partial W_k(t)}{\partial W_{km}(t)}$$

$$\theta(t+1) = \theta(t) - \eta_2 \cdot \frac{\partial E}{\partial \theta(t)}$$

where $\eta_1$ and $\eta_2$ are coefficients for determining the learning rate, and t is the learning step number (time). For further details, refer to an article entitled "Learning Internal Representations by Error Propagation" by D. E. Rumelhart et al., Parallel Distributed Processing, Vol. 1, chap 8, '86, MIT Press.

The contents of the memories 4 and 7 are replaced with the coefficients and the threshold value newly obtained by the learning processing unit 22. The learning is completed at the time the error function E falls to an allowable value or below after the processing subsequent to the initialization of the memories 4 and 7 has been performed recursively for all the learning data. It is also possible to learn the threshold value function coefficients in the ninth embodiment using the same gradient descent procedure. Namely, the learning of the threshold value function coefficients is performed such that $$\theta_m(t+1) = \theta_m(t) - \eta_3 \cdot \frac{\partial E}{\partial \theta(t)} \cdot \frac{\partial \theta(t)}{\partial \theta_m(t)}$$

Although, in the above embodiments, the back propagation learning is used as a learning procedure, it is also easy to use another conventionally proposed learning procedure such as perceptron learning, Hebb learning, orthogonal learning, correlative learning, self-organizing learning, or the like.

Although, in the above example, all the synaptic function coefficients are learned and corrected equally during learning, there is a procedure which, at an early stage in learning, makes part of those coefficients fixed and, at the late stage, gradually learns and corrects them.

Figure 15:
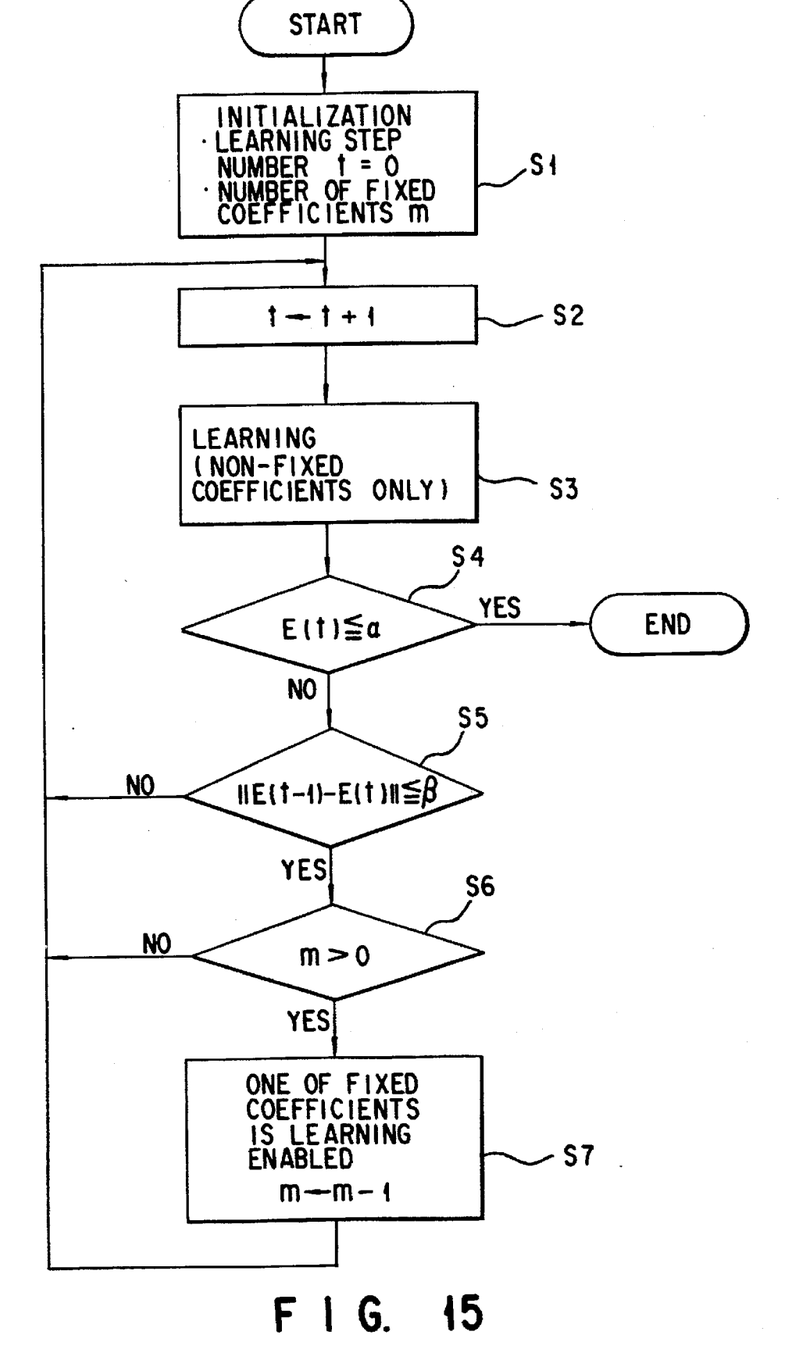
FIG. 15 is a flowchart illustrating a learning procedure in the neuron unit of FIG. 14.

In FIG. 15 there is illustrated a flowchart for such a learning procedure.

First, at learning initialization time, the number of times of learning t (the learning step number), those coefficients of synaptic weight function coefficients which are not learned and corrected (i.e., fixed coefficients), and their number m are set (step 1). After the learning step number t has been incremented by one (step S2), the above-described learning procedure is performed on other coefficients than the fixed coefficients (step S3). A comparison is subsequently made between the error function E(t) and an allowable error α (>0) in step S4. When the error function E(t) falls to the allowable error a or below (YES in step S4), the learning procedure is completed. If, however, the error function E(t) has not fallen in the allowable range of error (NO in step S4), then a comparison is made between the degree to which the error has been decremented, i.e., $$\|E(t-1)-E(t)\|$$

and a set value β (>0) (step S5). If the determination is that the degree has fallen to the set value or below (YES in step S5), then a check is made, in step S6, for the number of the fixed coefficients. If NO in step S5, on the other hand, return is made to step S2 to repeat the learning procedure. Also, when the determination in step S6 is that the fixed coefficients have been used up. i.e., when m=0, the learning procedure is repeated. In the presence of the fixed coefficients, i.e., when m>0 in step S6, one of the fixed coefficients becomes learning enabled, and the number of the fixed coefficients is decremented by one (step S7). Such processing is performed recursively until the error function E(t) falls in the range of allowable error. This learning procedure may be considered to learn a rough mapping relation first and a detailed mapping relation next. The use of this method would facilitate additional learning of new data after the termination of learning.

The embodiment shown in FIG. 14, which is quipped with the learning processing unit 22 and the random number generator 23 and thus permits online learning, permits real-time learning processing and offers an improvement in performance by the use of malfunction input data obtained during normal operation. As compared with a system equipped with a learning processing unit external to a neuron unit and thus adapted for offline learning, a data area for storing the above-mentioned malfunction input data can be reduced to a minimum. An arrangement is also permitted in which a plurality of neuron units share a learning processing unit and a random number generator.

As compared with conventional neuron units, the neuron units of the present invention offer an improvement in mapping capability because their synapse sections have a nonlinear response to their inputs. This permits a neural network that has substantially the same capability as was obtained with conventional neuron units to be implemented with a smaller number of neuron units. Moreover, the reduction of the time required for learning, the avoidance of encountering a local minimum, and the additional learning of new data are facilitated.

According to the present invention, as described above, there is provided a neuron unit which, by varying synaptic weights and/or a threshold value θ with the magnitude of external inputs to thereby improve its mapping capability, can be adapted to implement a high-performance, high-speed network with a small number of neuron units.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A neuron unit comprising:

a synapse section including;

synaptic weight generating means for generating a synaptic weight corresponding to the magnitude of an input signal, and multiplier means for multiplying said input signal and said synaptic weight, and a neuron section including;

first adder means for adding output signals of said multiplier means together, threshold value generating means for generating a threshold value, second adder means for adding an output of said threshold value generating means to an output of said first adder means, and conversion means for subjecting an output of said second adder means to a predetermined conversion.

2. A neuron unit according to claim 1, in which said synaptic weight generating means includes:

storage means for storing synaptic weights each corresponding to the magnitude of a respective one of predetermined learning input signals; and interpolation means for interpolating a synaptic weight, corresponding to said input signal, from said synaptic weights stored in said storage means.

3. A neuron unit according to claim 2, in which said interpolation means performs polynomial interpolation based on said synaptic weights stored in said storage means.

4. A neuron unit according to claim 2, in which said synaptic weight generating means further includes quantization means for quantizing a magnitude of said input signal in a variable quantization width.

5. A neuron unit according to claim 4, further comprising:

random number generating means for generating predetermined random numbers; and learning means for setting initial values of synaptic weights and a threshold value on the basis of random numbers generated by said random number generating means, correcting said synaptic weights and said threshold value on the basis of externally input target data, and storing said synaptic weights and threshold value into said storage means.

6. A neuron unit according to claim 4, further comprising:

random number generating means for generating predetermined random numbers; and learning means for setting initial values of synaptic weights and coefficients of said predetermined functions on the basis of random numbers generated by said random number generating means, correcting coefficients and said synaptic weights stored in said storage means on the basis of externally input target data, and storing said synaptic weights and said coefficients into said storage means.

7. A neuron unit according to claim 6, in which said learning means performs a learning process comprising the steps of:

(a) initializing a number of times learning is performed, fixed coefficients of coefficients of said predetermined functions and a number of said fixed coefficients;

(b) performing predetermined learning using coefficients other than said fixed coefficients while updating the number of times said learning is performed until an error function value of a result of said learning falls within an allowable error range;

(c) checking the number of said fixed coefficients while comparing a degree of decrease of error with a preset value until the degree of decrease of error falls to within said preset value, when said error function value of the result of said learning is outside said allowable error range;

repeating steps (a) to (c) when said checking step indicates all of said fixed coefficients have been used already;

learning enabling a predetermined number of said unused fixed coefficients, when unused fixed coefficients are found in said checking step; and decrementing the number of said fixed coefficients by said predetermined number.

8. A neuron unit according to claim 2, further comprising delay means for delaying input signals from external input means or preceding neuron units by a predetermined time, and in which said storage means stores synaptic weights corresponding to said predetermined learning input signals which are input to said delay means and predetermined learning outputs of said delay means corresponding to said predetermined learning input signals, and said interpolation means interpolates synaptic weights corresponding to said input signals and output signals from said delay means by interpolation from said synaptic weights stored in said storage means.

9. A neuron unit according to claim 2, further comprising delay means for delaying a previous output signal of said neuron section by a predetermined time and feeding said previous output signal back to said function processing means when next input signals are input.

10. A neuron unit according to claim 1, in which
said threshold value generating means includes:
storage means for storing threshold values each corresponding to a respective one of predetermined output values of said first adder means; and
interpolation means for interpolating a threshold value, corresponding to an output of said first adder means, from said threshold values stored in said storage means.

11. A neuron unit according to claim 10, in which
said interpolation means performs polynomial interpolation based on said threshold values stored in said storage means.

12. A neuron unit according to claim 10, in which said threshold generating means further includes quantization means for quantizing a magnitude of an output signal of said first adder means in a variable quantization width.

13. A neuron unit according to claim 12, further comprising:
random number generating means for generating predetermined random numbers; and
learning means for setting initial values of synaptic weights and a threshold value on the basis of random numbers generated by said random number generating means, correcting said synaptic weights and said threshold value on the basis of externally input target data, and storing said synaptic weights and threshold value into said storage means.

14. A neuron unit according to claim 1, in which
said synaptic weight generating means includes:
storage means for storing predetermined functions and coefficients of said predetermined functions each defined for a respective one of said multiplier means; and function calculating means responsive to said functions and said coefficients stored in said storage means for obtaining a synaptic weight as a function value of said input signal.

15. A neuron unit according to claim 14, further comprising delay means for delaying input signals from external input means or preceding neuron units by a predetermined time, and in which said function calculating means obtains synaptic weights as function values of said input signals and output signals from said delay means.

16. A neuron unit according to claim 14, further comprising delay means for delaying a previous output signal of said neuron section by a predetermined time and feeding said previous output signal back to said function processing means when next input signals are input.

17. A neuron unit according to claim 14, further comprising:
random number generating means for generating predetermined random numbers; and
learning means for setting initial values of coefficients of said predetermined functions and a threshold value on the basis of random numbers generated by said random number generating means, correcting coefficients from said coefficient storage means and said threshold values on the basis of externally input target data, and storing said coefficients and a threshold value into said storage means.

18. A neuron unit according to claim 17, in which said learning means performs a learning process comprising the steps of:

(a) initializing a number of times learning is performed, fixed coefficients of coefficients of said predetermined functions and a number of said fixed coefficients;

(b) performing predetermined learning using coefficients other than said fixed coefficients while updating the number of times said learning is performed until an error function value of a result of said learning falls within an allowable error range;

(c) checking the number of said fixed coefficients while comparing a degree of decrease of error with a preset value until the degree of decrease of error falls to within said preset value, when said error function value of the result of said learning is outside said allowable error range;

repeating steps (a) to (c) when said checking step indicates all of said fixed coefficients have been used already;

learning enabling a predetermined number of said unused fixed coefficients, when unused fixed coefficients are found in said checking step; and decrementing the number of said fixed coefficients by said predetermined number.

19. A neuron unit according to claim 1, in which
said threshold value generating means includes:
storage means for storing predetermined functions and coefficients of said predetermined functions; and
function calculating means responsive to said predetermined functions and said coefficients stored in said storage means for obtaining a threshold value as a function value for an output of said first adder means.

20. A neuron unit comprising:
a synapse section including:
storage means for storing, in advance, a plurality of synaptic weight groups, each including combinations of a plurality of synaptic weights that take discrete values resulting from learning ;

interpolation means for reading out from said storage means one of said plurality of synaptic weight groups which corresponds to an input signal received from an external input means or a preceding neuron unit, and interpolating said one of the synaptic weight groups in order to obtain an interpolated value corresponding to said input signal, to thereby obtain a new synaptic weight;

multiplier means for multiplying said synaptic weights obtained by said interpolation means and said input signal; and a neuron section including:

first adder means for receiving output signals from said multiplier means and for adding up said output signals;

threshold value generating means for generating a threshold value;

second adder means for adding said threshold value to an output of said first adder means; and conversion means for subjecting an output of said second adder means to a predetermined conversion.

21. A neuron unit according to claim 20, wherein:

said synapse section has a plurality of multiplier means corresponding to a plurality of input signals from said external input means or said preceding neuron unit, said interpolation means is connected so that said interpolated new synaptic weight is supplied to each of said multiplier means, and said plurality of input signals are input to said interpolation means.

22. A neuron unit according to claim 20, wherein:

said synapse section includes one of each of said storage means, said interpolation means and said multiplier means, a plurality of said input signals are input to said interpolation means and said multiplier means in time sequence order; and said first adder means receives output signals from said multiplier means, and adds up said output signals.

23. A neuron unit according to claim 22, wherein said first adder means includes count means for:

counting a number of add-up operations carried out for the output signals from said multiplier means in order, instructing said first adder means to complete the add-up operations when said counted number of add-up operations reaches a predetermined value, and instructing said second adder means to add up threshold values from said threshold value generating means.

24. A neuron unit according to claim 20, wherein said threshold value generating means includes:

storage means for storing threshold values, each corresponding to a respective one of predetermined learning output values of said first adder means; and interpolation means for interpolating a threshold value, corresponding to an output of said first adder means, from said threshold values stored in said storage means.

25. A neuron unit according to claim 24, wherein said interpolation means performs polynomial interpolation based on said threshold values stored in said storage means.

26. A neuron unit according to claim 24, wherein said threshold generating means further includes quantization means for quantizing a magnitude of an output signal of said first adder means in a variable quantization width.

27. A neuron unit according to claim 26, further comprising:

random number generating means for generating predetermined random numbers; and learning means for setting initial values of synaptic weights and a threshold value on the basis of random numbers generated by said random number generating means, correcting said synaptic weights and said threshold value on the basis of externally input target data, and storing said synaptic weights and a threshold value into said storage means.

28. A neuron unit according to claim 20, wherein said threshold value generating means includes:

storage means for storing predetermined functions and coefficients of said predetermined functions; and function calculating means responsive to said predetermined functions and said coefficients stored in said storage means for obtaining a threshold value as a function value for an output of said first adder means.

29. A neuron unit according to claim 28, further comprising:

random number generating means for generating predetermined random numbers; and learning means for setting initial values of synaptic weights and coefficients of said predetermined functions on the basis of random numbers generated by said random number generating means, correcting coefficients and said synaptic weights stored in said storage means on the basis of externally input target data, and storing said synaptic weights and said coefficients into said storage means.

30. A neuron unit according to claim 29, wherein said learning means performs a learning process comprising the steps of:

(a) initializing a number of times learning is performed, fixed coefficients of coefficients of said predetermined functions and a number of said fixed coefficients;

(b) performing predetermined learning using coefficients other than said fixed coefficients while updating the number of times said learning is performed until an error function value of a result of said learning falls within an allowable error range;

(c) checking the number of said fixed coefficients while comparing a degree of decrease of error with a preset value until the degree of decrease of error falls to within said preset value, when said error function value of the result of said learning is outside said allowable error range;

repeating steps (a) to (c) when said checking step indicates all of said fixed coefficients have been used already;

learning enabling a predetermined number of said unused fixed coefficients, when unused fixed coefficients are found in said checking step; and decrementing the number of said fixed coefficients by said predetermined number.

31. A neuron unit according to claim 20, wherein said interpolation means performs polynomial interpolation based on said synaptic weights stored in said storage means.

32. A neuron unit according to claim 20, wherein said synapse section further includes quantization means for quantizing a magnitude of said input signal in a variable quantization width.

33. A neuron unit according to claim 32, further comprising:

random number generating means for generating predetermined random numbers; and learning means for setting initial values of synaptic weights and a threshold value on the basis of random numbers generated by said random number generating means, correcting said synaptic weights and said threshold value on the basis of externally input target data, and storing said synaptic weights and a threshold value into said storage means.

34. A neuron unit according to claim 20, further comprising delay means for delaying input signals from external input means or preceding neuron units by a predetermined time, wherein said storage means stores synaptic weights corresponding to predetermined learning input signals and predetermined learning outputs, and said interpolation means interpolates synaptic weights corresponding to said input signals and output signals from said delay means by interpolation from said synaptic weights stored in said storage means.

35. A neuron unit according to claim 20, further comprising delay means for delaying a previous output signal of said neuron section by a predetermined time and feeding the previous output signal back to said interpolation means when next input signals are input.

* * * * *